(12) United States Patent
Lee et al.

(10) Patent No.: US 8,320,980 B2
(45) Date of Patent: Nov. 27, 2012

(54) ANTENNA ASSEMBLY OF MOBILE TERMINAL

(75) Inventors: Jong Deok Lee, Suwon-si (KR); Sang Up Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 321 days.

(21) Appl. No.: 12/455,535

(22) Filed: Jun. 3, 2009

(65) Prior Publication Data
US 2009/0305755 A1    Dec. 10, 2009

(30) Foreign Application Priority Data
Jun. 5, 2008    (KR) .................. 10-2008-0052931

(51) Int. Cl.
*H04M 1/00* (2006.01)
(52) U.S. Cl. .............. 455/575.7; 455/550.1; 455/575.1; 455/575.3; 455/575.4; 343/702
(58) Field of Classification Search ............... 455/575.7, 455/550.1, 575.1, 575.3, 575.4; 343/702
See application file for complete search history.

(56) References Cited

U.S. PATENT DOCUMENTS 6,861,989 B2 * 3/2005 Morningstar et al. ........ 343/702
7,286,089 B2 * 10/2007 Lee et al. ..................... 343/702

FOREIGN PATENT DOCUMENTS

KR    1020080039733 A    5/2008
* cited by examiner

*Primary Examiner* — Temica M Beamer

(57) ABSTRACT

An antenna assembly of a mobile terminal is provided. The antenna assembly of a mobile terminal includes: a main antenna disposed at a side of the mobile terminal; a first coupling antenna coupled to the main antenna in a first mechanical state of the mobile terminal; and a second coupling antenna coupled to the main antenna in a second mechanical state according to a mechanical operation of the mobile terminal.

20 Claims, 11 Drawing Sheets

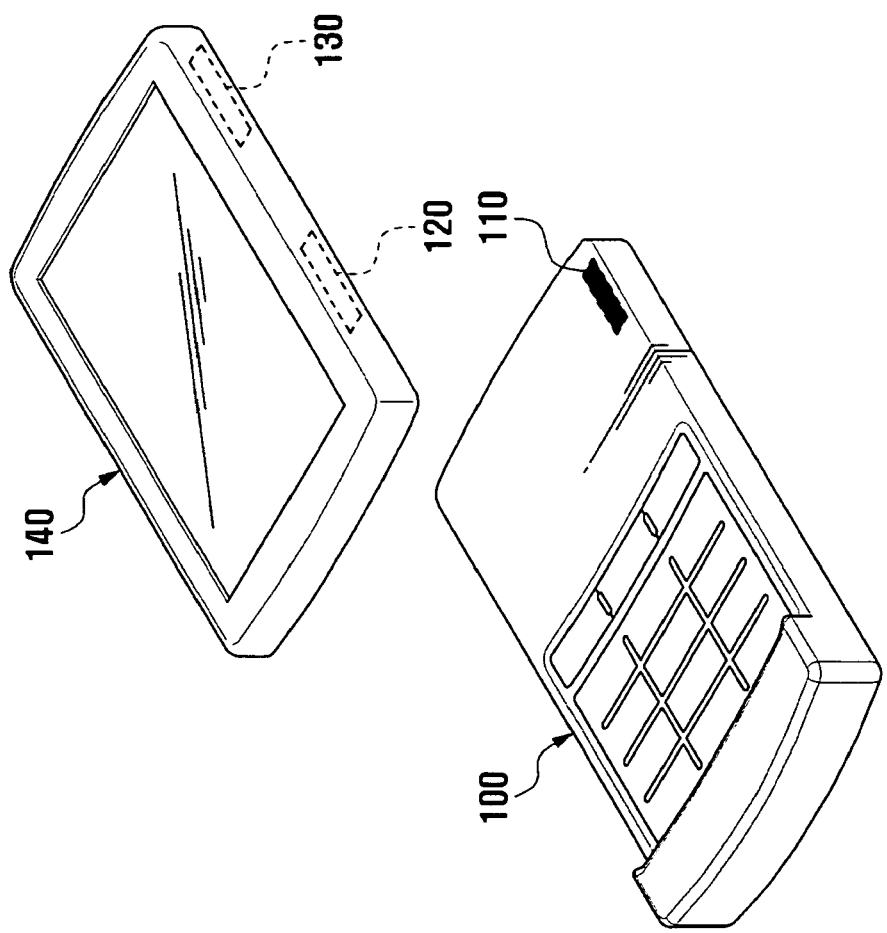

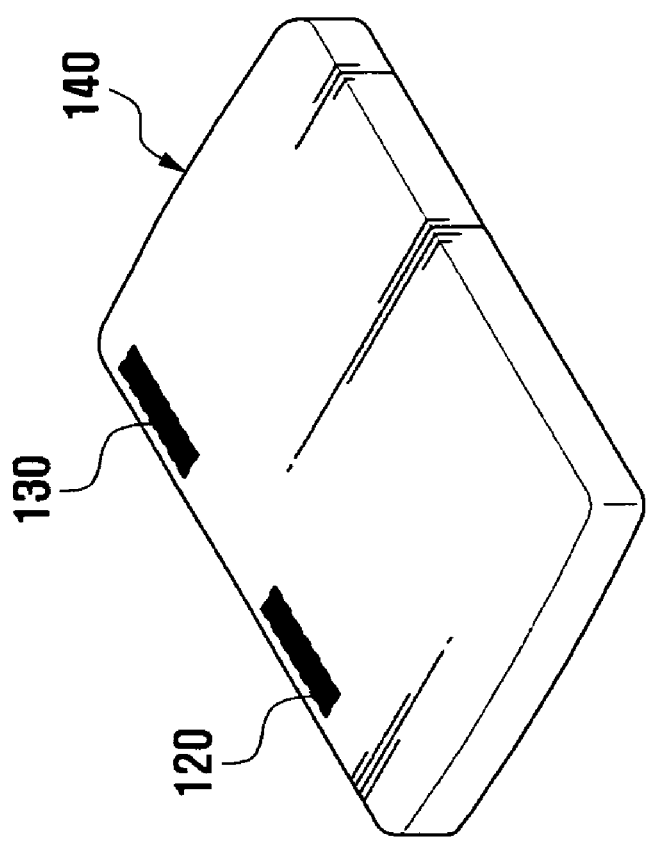

ANTENNA ASSEMBLY OF MOBILE TERMINAL

CROSS-REFERENCE TO RELATED APPLICATION(S) AND CLAIM OF PRIORITY

The present application claims priority to an application entitled "ANTENNA ASSEMBLY OF MOBILE TERMINAL" filed in the Korean Intellectual Property Office on Jun. 5, 2008 and assigned Serial No. 10-2008-0052931, the contents of which are incorporated herein by reference.

TECHNICAL FIELD OF THE INVENTION

The present invention relates generally to an antenna assembly of a mobile terminal, and more particularly, to an antenna assembly of a mobile terminal that can obtain a good frequency band and gain value regardless of a mechanical state change of the mobile terminal.

BACKGROUND OF THE INVENTION

Nowadays, mobile terminals are widely used, largely due to their mobility. For example, mobile communication terminals that can perform voice communication while moving are used by more than 85% of the Korean population.

The mobile communication terminal includes an input device for receiving user input, such as a keypad, touch pad, and wheel, and a display unit for displaying user input and other data. The display unit displays activation of a specific application and screen conversion corresponding to a key event or a touch event occurring in the input device. Further, the mobile communication terminal includes a radio frequency (RF) unit for transmitting a voice signal input by a user to another mobile communication terminal and for receiving a voice signal from another mobile communication terminal.

The mobile communication terminal has been developed to perform various mechanical operations according to a user's preference. For example, various types of mobile communication terminals are available, such as a folder type in which a first body and a second body are connected by a hinge and the second body performs a rotation operation by a predetermined angle about the hinge, and a slide type in which a first body and a second body are disposed to face each other and the second body performs a sliding operation or a rotation operation relative to an upper part and a lower part of the first body.

However, due to a trend of slimming the terminal, it is difficult to appropriately dispose an antenna in a sliding up and down structure of a conventional slide type mobile communication terminal and in a folding open and closed structure of a conventional folder type mobile communication terminal. Further, in order to reinforce strength in a slim structure of the sliding up and down structure of the conventional slide type mobile communication terminal and of the folding open and closed structure of the conventional folder type mobile communication terminal, a case of a metal material, such as magnesium and aluminum, is generally used. Accordingly, when a conventional mobile terminal uses one antenna at a mechanical operation, i.e., at a sliding up and down operation or a folding open and closed operation of the mobile terminal, a radiation pattern changes according to a disposition environment of the case of a metal material. In the slide type mobile terminal, according to a disposition of a speaker, keypad, and display unit mounted in the mobile terminal, at sliding up and down, radiation efficiency of an antenna is reduced. Further, in a mobile music phone, in addition to a receiver, a speaker having a large resonance space is disposed, and in a mobile message phone, because a large keypad and a structure for firmly supporting the large keypad are formed, the mobile message phone has an external form that is detrimental to radiation efficiency of an antenna.

FIG. 1A is a diagram illustrating a radiation pattern after a slide type mobile terminal performs a slide opening operation, and FIG. 1B is a diagram illustrating a radiation pattern before a slide type mobile terminal performs a slide opening operation.

As shown in FIGS. 1A and 1B, a conventional mobile terminal has an extremely distorted antenna radiation pattern in both the open and closed positions. In order to solve the problem, conventionally, a mobile terminal having two antennas, a switch for selecting each antenna, and signal lines for connecting each antenna, has been suggested. However, such a mobile terminal is not consistent with a demand for reducing a thickness and size of the mobile terminal, in which a separate space for forming an additional antenna and switch and signal lines for connecting each antenna cannot easily be secured.

SUMMARY OF THE INVENTION

To address the above-discussed deficiencies of the prior art, it is a primary object to provide an antenna assembly of a mobile terminal that can have an effective antenna bandwidth and gain value even though a state of the mobile terminal is changed due to a mechanical operation of the mobile terminal.

In accordance with an aspect of the present invention, an antenna assembly of a mobile terminal having a first body and second body includes: a main antenna disposed at the first body; and a first coupling antenna and second coupling antenna disposed at the second body for individually coupling to the main antenna according to a change of a mechanical state of the mobile terminal.

In accordance with another aspect of the present invention, an antenna assembly of a mobile terminal having a first body and second body includes: a main antenna disposed at the first body; and a coupling antenna disposed at the second body for coupling to the main antenna according to a change of a mechanical state of the mobile terminal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 3A and 3B are perspective views illustrating a disposition location of an antenna assembly of the slide type mobile terminal of FIGS. 2A and 2B;

DETAILED DESCRIPTION OF THE INVENTION

Figure 1A:
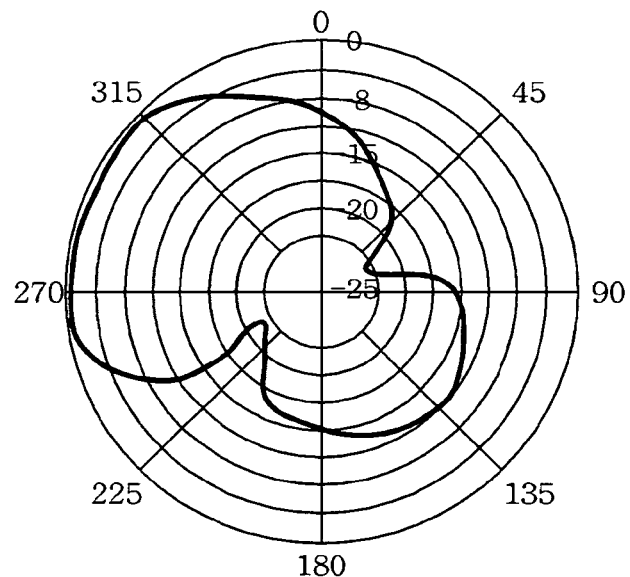
FIGS. 1A and 1B are diagrams illustrating a radiation pattern of a conventional mobile terminal.
Figure 1B:
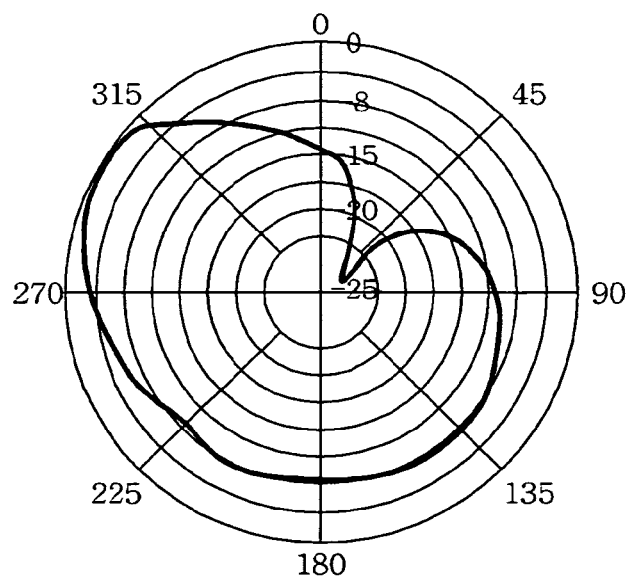

FIGS. 2A through 7B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile communications device.

In the following description, an antenna assembly of a mobile terminal, such as a slide type phone and a folder type phone, that can compensate antenna radiation loss arising when a mechanical state of the mobile terminal changes due to a mechanical operation thereof, by providing a coupling antenna corresponding to each state, is described. In the present invention, when a main antenna is disposed at a location of weak antenna radiation according to a state change of slide up/down, slide rotation, and folder open/closed, a coupling antenna is disposed at a location that can obtain antenna radiation efficiency without a cable and connector by using a feeding unit and specific pattern having the greatest influence on the main antenna. In the antenna assembly according to the present invention, an auxiliary antenna should be positioned so that a main antenna and an auxiliary antenna may exhibit coupling characteristics, and the auxiliary antennas are disposed at fully separated locations at slide up/down, slide rotated, and folder open/closed states.

In other words, an antenna assembly according to the present invention can obtain effective antenna radiation efficiency by providing an auxiliary antenna to couple to a main antenna when a mechanical state is changed due to a mechanical operation of the mobile terminal.

In the exemplary embodiments, a mobile communication terminal is described as an example of a mobile terminal, however the present invention is not limited thereto. The mobile terminal according to the present invention is a terminal including an antenna, and may be an information and communication device or a multimedia device, such as a personal digital assistant (PDA) having a communication function, smart phone, third generation (3G) terminal, for example, International Mobile Telecommunication 2000 (IMT-2000) terminal, wideband code division multiple access (WCDMA) terminal, and universal mobile telecommunication service (UMTS) terminal, and applications thereof.

In the following description, a mobile terminal including an antenna assembly according to the present invention is a vertical slide type-mobile terminal, rotational slide type mobile terminal, and folder type mobile terminal. As an auxiliary antenna in addition to a main antenna, a first coupling antenna and second coupling antenna are exemplified. The mobile terminal according to the present exemplary embodiment has two mechanical states, wherein a first state is a folder-open state, slide-up state, and slide-rotated state, and a second state is a folder-closed state, slide-down state, and slide-non-rotated state.

Figure 2A:
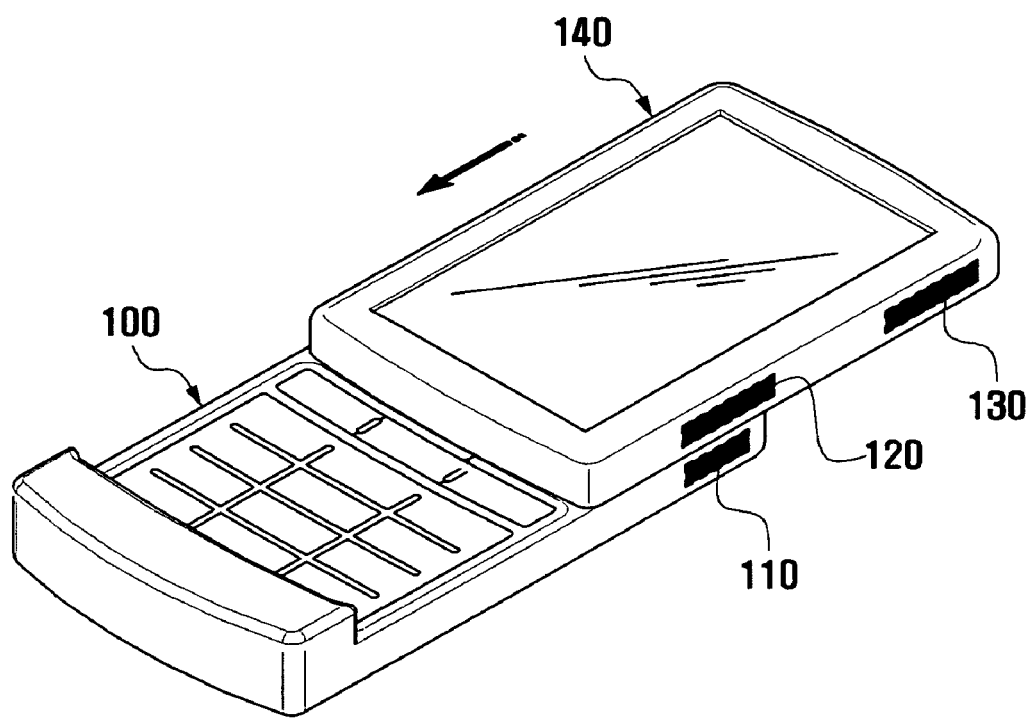
FIGS. 2A and 2B are perspective views illustrating an up/down slide type mobile terminal according to an exemplary embodiment of the present invention.
Figure 2B:
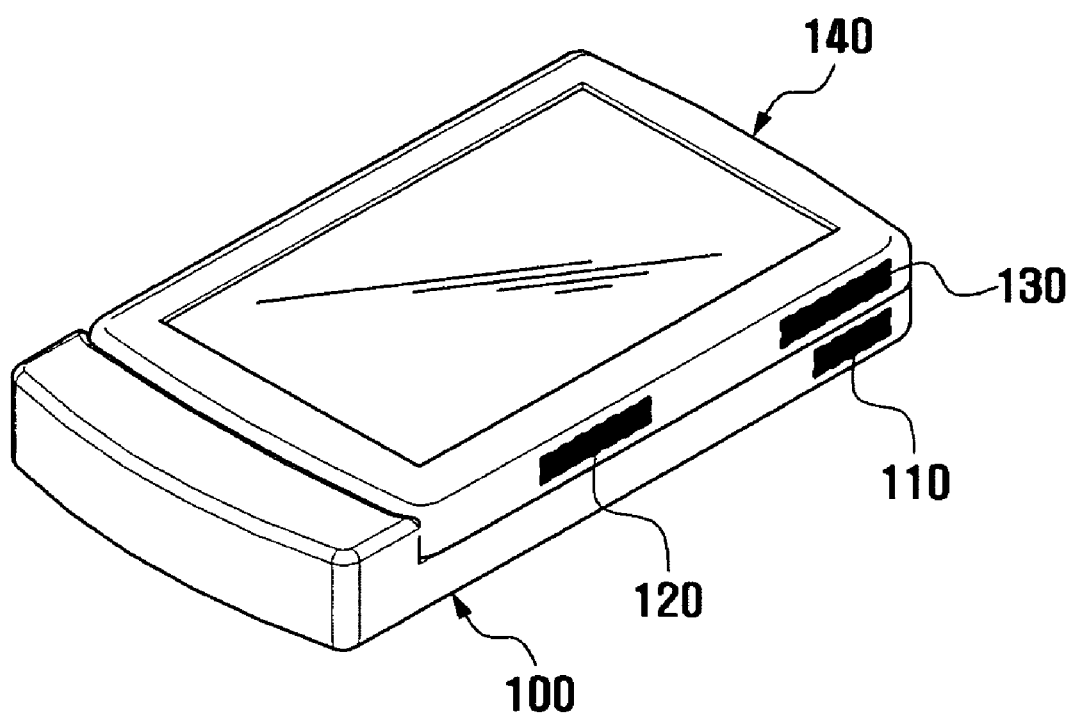

FIGS. 2A and 2B are perspective views illustrating an up/down slide type mobile terminal according to an exemplary embodiment of the present invention.

Referring to FIGS. 2A and 2B, the mobile terminal according to the present exemplary embodiment includes a first body 100, second body 140, main antenna 110 disposed at the first body 100, and first coupling antenna 120 and second coupling antenna 130 disposed at the second body 140.

The first body 100 and the second body 140 are two elements of the mobile terminal for explaining a sliding structure, and elements included in each body can be changed according to a designer's intention. Accordingly, elements of the mobile terminal according to the present exemplary embodiment are not limited to the elements described here.

The first body 100 includes a battery, microphone, main keypad, and main printed circuit board (PCB). The PCB includes a wireless communication module for performing wireless communication of the mobile terminal. A connector for connecting an external device is formed at a side of the first body 100 including the PCB. For example, at a side of the first body 100, an interface, for example a 20-pin connector, for connecting an external device is formed. A front surface of the first body 100 faces a rear surface of the second body 140, and the second body 140 has a structure, for example a rail structure, that can slide up and down in the front surface of the first body 100. Particularly, the main antenna 110 is disposed at a side, for example the right side, of the first body 100.

The second body 140 includes a display unit, sub-keypad, speaker, and camera module. The second body 140 is disposed on the front surface of the first body 100 and moves in a vertical direction, i.e., an up/down direction along the front surface of the first body 100 by a user manipulation. An elastic member is disposed between the second body 140 and the first body 100 so that the second body 140 may easily move in a vertical direction when a predetermined force is applied. At a side of the second body 140, for example at a side portion corresponding to an area where the main antenna 110 is disposed, the first coupling antenna 120 and the second coupling antenna 130 are disposed.

The main antenna 110 is disposed at a side of the first body 100, and includes an antenna feeding unit connected to the wireless communication module included in the PCB of the first body 100, and a main coupling antenna electrically connected to the antenna feeding unit and for coupling to the first coupling antenna 120 and the second coupling antenna 130. The antenna feeding unit provides a path for connecting the wireless communication module and the main coupling antenna and for transmitting and receiving a signal. The main coupling antenna is coupled to either the first coupling antenna 120 or the second coupling antenna 130 according to a sliding operation of the mobile terminal and receives a signal to output to the wireless communication module from the first coupling antenna 120 or the second coupling antenna 130, and transmits a signal received from the wireless communication module to the first coupling antenna 120 or the second coupling antenna 130. The main coupling antenna may be formed integrally with the antenna feeding unit, or formed in a predetermined pattern.

The first coupling antenna 120 is disposed at a side of the second body 140, and after a location of the second body 140 is changed by a slide opening operation, the first coupling antenna 120 is disposed at a location shown in FIG. 2A, at which location the first coupling antenna 120 is coupled to the main antenna 110. For example, when the main antenna 110 is disposed at an upper part of the right side of the first body 100, the first coupling antenna 120 is disposed at a lower part of the right side of the second body 140. Accordingly, as the second body 140 performs a slide opening operation along a front surface of the first body 100, when a mechanical state of the mobile terminal changes, the first coupling antenna 120 is disposed at a location to be coupled to the main antenna 110. The first coupling antenna 120 is formed in a predetermined pattern to reduce space and to improve an antenna efficiency of the mobile terminal.

The second coupling antenna 130 is disposed at a side of the second body 140 and is disposed at a location shown in FIG. 2B, at which location the second coupling antenna 130 is coupled to the main antenna 110 before the second body 140 performs a slide opening operation. For example, when the main antenna 110 is disposed at an upper part of the right side of the first body 100, the second coupling antenna 130 is disposed at an upper part of the right side of the second body 140. Accordingly, the second coupling antenna 130 is coupled to the main antenna 110 while sustaining a state adjacent to the first body 100 before the second body 140 performs a slide opening operation. Similarly to the first coupling antenna 120, the second coupling antenna 130 is also formed in a predetermined pattern, thereby reducing space required in the mobile terminal and improving antenna radiation efficiency.

In some embodiments, the first coupling antenna 120 and the second coupling antenna 130 are separated by a predetermined distance such that neither coupling antenna has an influence on the other coupling antenna while performing a coupling operation with the main antenna 110. The first coupling antenna 120 and the second coupling antenna 130 are separated by a predetermined distance, for example, several millimeters (mm), and the distance is changed according to characteristics and conditions of the mobile terminal. In FIGS. 2A and 2B illustrating the present exemplary embodiment, the main antenna 110, the first coupling antenna 120, and the second coupling antenna 130 are shown disposed at the outside of the first body 100 and the second body 140. However in order to avoid a contact with a user's hand, in some embodiments, antennas are disposed within a case of the first body 100 and the second body 140.

In FIGS. 2A and 2B illustrating the present exemplary embodiment, the main antenna 110, the first coupling antenna 120, and the second coupling antenna 130 are shown disposed at an upper part of the right side of the first body 100 and at an upper part and lower part of the right side of the second body 140, respectively. However the main antenna 110, the first coupling antenna 120, and the second coupling antenna 130 may alternatively be disposed at an upper part of the left side of the first body 100 and at an upper part and lower part of the left side of the second body 140, respectively.

As described above, as a mechanical state of the mobile terminal according to the present exemplary embodiment is changed by a slide opening operation, the main antenna 110 is coupled to the first coupling antenna 120 and transmits and receives a signal, whereby the main antenna 110 can obtain an appropriate bandwidth and gain through coupling to the first coupling antenna 120 while maintaining a small antenna size. In this case, because a separate switch or connection line is not provided between the main antenna 110 and the first coupling antenna 120, an additional element for connecting the main antenna 110 and the first coupling antenna 120 is unnecessary, whereby the mobile terminal is easily manufactured and does not require an additional design cost. Before performing a slide opening operation, the main antenna 110 is coupled to the second coupling antenna 130, and after performing a slide opening operation, the main antenna 110 is coupled to the first coupling antenna 120, and thereby the mobile terminal according to the present exemplary embodiment can transmit and receive a signal at the same strength in both open and closed positions. By disposing an auxiliary antenna at a location to be coupled to the main antenna 110 in a changing antenna environment according to a sliding operation of the mobile terminal, the mobile terminal according to the present exemplary embodiment can reduce a size of the main antenna while maintaining an effective bandwidth and gain value thereof. The lengths and widths of the main antenna 110, the first coupling antenna 120, and the second coupling antenna 130 according to the present exemplary embodiment can be changed according to available space or environment for installing the main antenna 110, the first coupling antenna 120, and the second coupling antenna 130 in various forms of mobile terminal models. Therefore, by disposing each coupling antenna at a location to be coupled to the main antenna 110 in a changed mechanical state after a mechanical operation of the mobile terminal, the present invention can obtain an appropriate bandwidth and gain value.

FIGS. 3A and 3B are perspective views illustrating another disposition position of the antenna assembly of the slide type mobile terminal of FIGS. 2A and 2B.

Referring to FIGS. 3A and 3B, the main antenna 110 according to the present exemplary embodiment is disposed at an upper part of the right side of the front surface of the first body 100, as shown in FIG. 3A. The first coupling antenna 120 is disposed at a lower part of the right side (as viewed from the front surface of the first body 100) of the rear surface of the second body 140 facing the first body 100. The second coupling antenna 130 is separated by a predetermined distance from the first coupling antenna 120 and is disposed at an upper part of the right side (as viewed from the front surface of the first body 100) of the rear surface of the second body 140.

FIG. 3B is a perspective view illustrating the second body 140 in an inverted state.

Referring to FIG. 3B, the first coupling antenna 120 and the second coupling antenna 130 have a predetermined length at the second body 140 and are separated by a predetermined distance. The first coupling antenna 120 and the second coupling antenna 130 are coupled to the main antenna 110 according to a changed mechanical state before and after performing a slide opening operation of the mobile terminal. As the first coupling antenna 120 and the second coupling antenna 130 are disposed at the rear surface of the second body 140, after the first body 100 and the second body 140 are assembled, the first coupling antenna 120 and the second coupling antenna 130 cannot be viewed from the outside in a closed state of the mobile terminal. Further, as the main antenna 110 is disposed at an upper part of the right side of the front surface of the first body 100, the main antenna 110 is covered by the rear surface of the second body 140 and thereby cannot be viewed from the outside. As shown in FIGS. 3A and 3B, the main antenna 110, the first coupling antenna 120, and the second coupling antenna 130 are formed at the outside of a case of each body of the mobile terminal, and the antenna may be damaged due to friction resulting from a sliding operation. Therefore in some embodiments, the main antenna 110, the first coupling antenna 120, and the second coupling antenna 130 are disposed within the case of the corresponding body. A space of a predetermined width can thereto be formed within an upper part of the right side of the first body 100, and the main antenna 110 can be disposed within the space. In a similar way, the first coupling antenna 120 and the second coupling antenna 130 can be disposed at a predetermined space within the second body 140.

Although not specifically illustrated in FIGS. 3A and 3B, rails for a sliding operation may be formed in each of the first body 100 and the second body 140, and in a semi-automatically operating mobile terminal, a spring device may be additionally disposed.

As described above, as the mobile terminal according to the present exemplary embodiment obtains a bandwidth and gain value of an antenna by performing a coupling operation between the main antenna 110 and the first coupling antenna 120 and second coupling antenna 130, a separate signal line for connecting the main antenna 110 and the first coupling antenna 120 and second coupling antenna 130 and a switch for switching each antenna according to operation of the mobile terminal are unnecessary. Accordingly, in the mobile terminal according to the present exemplary embodiment, locations available for installing the main antenna 110 and the first coupling antenna 120 and second coupling antenna 130 increase remarkably. Further, in the mobile terminal according to the present exemplary embodiment, a wear phenomenon of a signal line or a switch due to repeated operation of the mobile terminal does not occur.

Figure 4A:
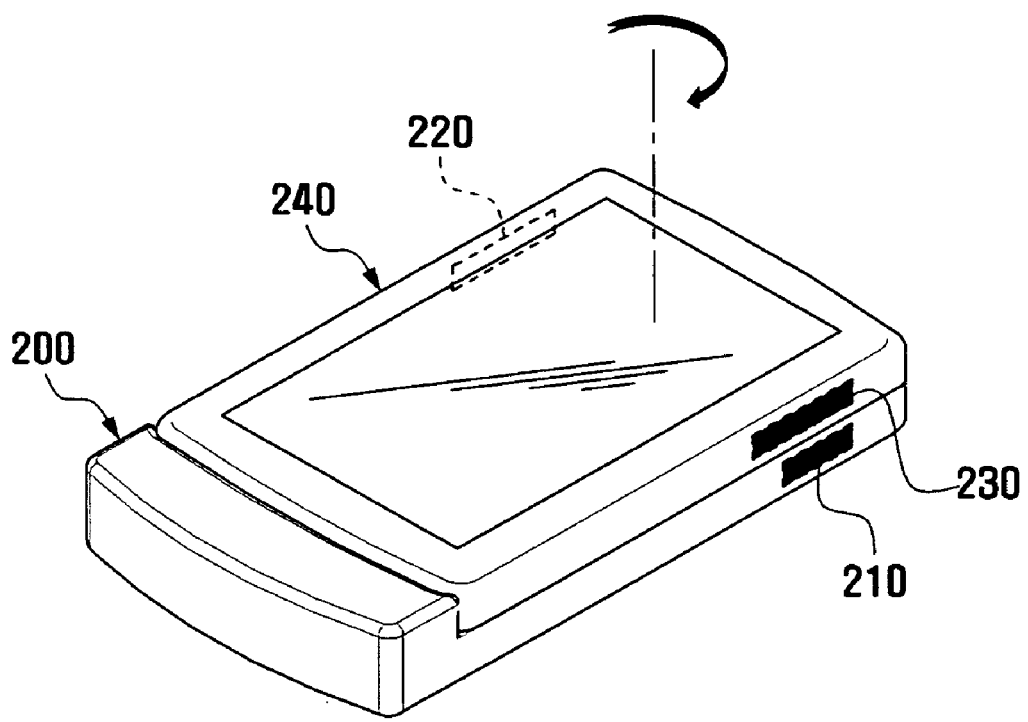
FIGS. 4A and 4B are perspective views illustrating a rotational slide type mobile terminal according to another exemplary embodiment of the present invention.
Figure 4B:
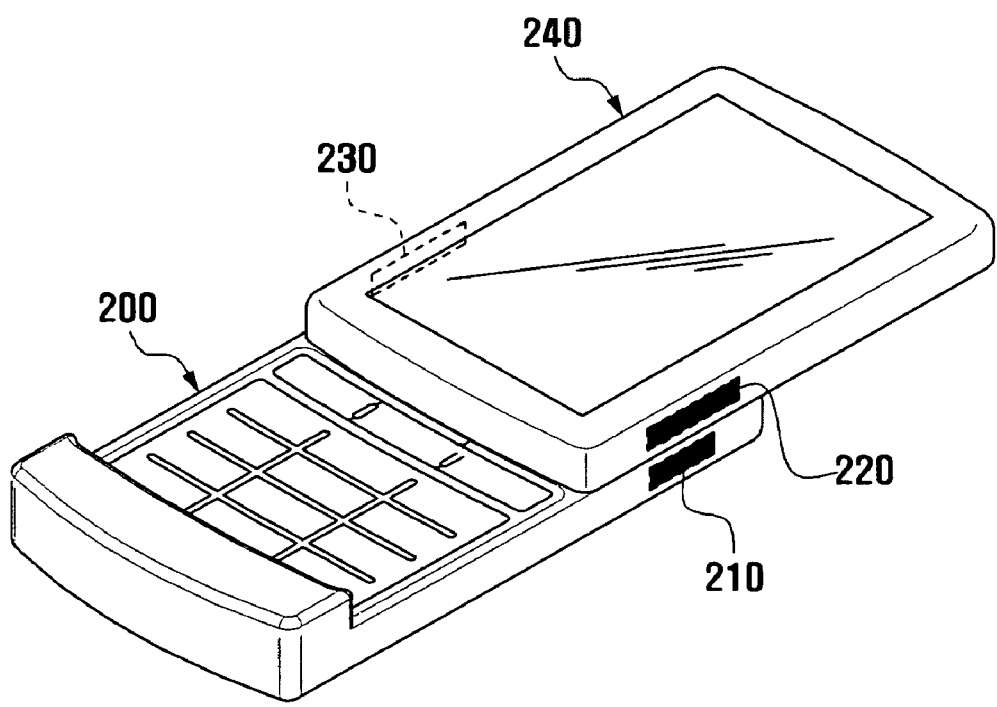

FIGS. 4A and 4B are perspective views illustrating a rotational slide type mobile terminal according to another exemplary embodiment of the present invention.

Referring to FIGS. 4A and 4B, the slide type mobile terminal according to the present exemplary embodiment includes a first body 200, and a second body 240 coupled to the first body 200 for performing a sliding rotation about a predetermined axis, for example, an axis perpendicular to an upper part of the first body 200. In a state where the first body 200 is fixed, when the second body 240 rotates in a clockwise or anticlockwise direction, the second body 240 can rotate at a predetermined angle, for example, 90°, 180°, 270° and 360°, about a connection shaft of the first body 200 and the second body 240. The rotational slide type mobile terminal according to the present exemplary embodiment has a first state in which the second body 240 rotates at a predetermined angle by a sliding operation, and a second state in which the first body 200 and the second body 240 are stacked to face each other. Hereinafter, the present exemplary embodiment exemplifies a slide type mobile terminal where the second body 240 rotates by 180° about the first body 200.

As shown in FIG. 4A illustrating a state before the second body 240 rotates, a main antenna 210 is disposed at an upper part of the right side of the first body 200. The main antenna 210 includes an antenna feeding unit connected to the PCB (not shown) of the first body 200, and a main coupling antenna disposed at a side of the first body 200.

A first coupling antenna 220 is disposed at an upper part of the left side of the second body 240, and a second coupling antenna 230 is disposed at an upper part of the right side of the second body 240. In the second state, that is, a state where the second body 240 is not rotated about the first body 200, the second coupling antenna 230 maintains a coupled state with the main antenna 210. Here, in consideration of a rotated state, speakers may be disposed at two locations, for example at an upper part and a lower part at the center of the second body 240.

When the second body 240 rotates by 180° about the first body 200, the second body 240 is inverted, and is positioned parallel to the first body 200 and extended to an upper part thereof, whereby the mobile terminal according to the present exemplary embodiment has a first state, as shown in FIG. 4B. Accordingly, a main keypad of the first body 200 that is covered before the second body 240 rotates is exposed, and a display unit of the second body 240 is displayed after inversion by 180°. The speakers of the second body 240 are also vertically inverted. Particularly, locations of the first coupling antenna 220 and the second coupling antenna 230 disposed at the second body 240 are also inverted relative to the first body 200. Therefore, the first coupling antenna 220 is disposed at a location for coupling to the main antenna 210, and the second coupling antenna 230 is disposed at a location at which the first coupling antenna 220 was initially disposed.

As described above, both in the second state before the second body 240 rotates about the first body 200, whereby the second coupling antenna 230 and the main antenna 210 are coupled, and in the first state where the second body 240 rotates about the first body 200, whereby the first coupling antenna 220 is coupled to the main antenna 210, the mobile terminal having an antenna assembly according to the present exemplary embodiment maintains an appropriate antenna bandwidth and gain. The main antenna 210, the first coupling antenna 220, and the second coupling antenna 230 according to the present exemplary embodiment are disposed at the outside of the case, however in order to minimize deformation of a radiation pattern due to a contact when a user holds the terminal, the antennas are disposed within the case.

Because the first coupling antenna 220 and the second coupling antenna 230 of the mobile terminal according to the present exemplary embodiment are coupled to the main antenna 210 at the same location, the first coupling antenna 220 and the second coupling antenna 230 have a similar radiation pattern. However, when the main keypad is made of a metal material, a radiation pattern of the main antenna 210 changes due to an influence of the main keypad exposed when the second body 240 rotates. Therefore, in some embodiments, a length, width, and form of the first coupling antenna 220 and the second coupling antenna 230 are determined in consideration of radiation efficiency of an antenna according to a rotation of the second body 240.

In the rotational slide type mobile terminal having an antenna assembly according to the present exemplary embodiment, the main antenna 210 may be disposed at a front surface of the first body 200 and the first coupling antenna 220 and second coupling antenna 230 may be disposed at a rear surface of the second body 240 similarly to the slide type mobile terminal shown in FIGS. 3A and 3B. The rear surface of the second body 240 faces the front surface of the first body 200. In this case, it is preferable that the main antenna 210, the first coupling antenna 220, and the second coupling antenna 230 are disposed within the first body 200 and the second body 240 to reduce wear or damage due to friction resulting from rotation of the second body 200.

In the rotational slide type mobile terminal according to the present exemplary embodiment, the main antenna 210 is disposed at an upper part of the right side of the first body 200, the first coupling antenna 220 is disposed at an upper part of the left side of the second body 240, and the second coupling antenna 230 is disposed at an upper part of the right side of the second body 240, however the main antenna 210 may be disposed at an upper part of the left side of the first body 200, the first coupling antenna 220 may be formed at an upper part of the right side of the second body 240, and the second coupling antenna 230 may be formed at an upper part of the left side of the second body 240.

Figure 5:
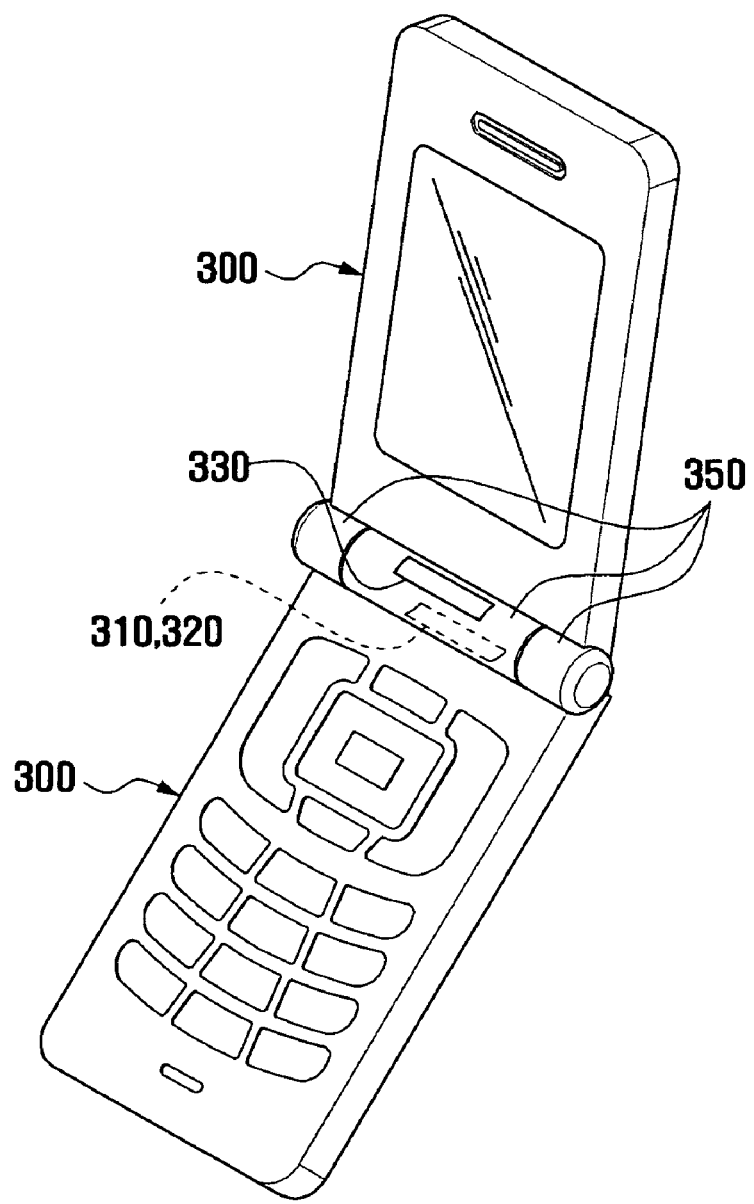
FIG. 5 is a perspective view illustrating a folder type mobile terminal according to another exemplary embodiment of the present invention.

FIG. 5 is a perspective view illustrating a folder type mobile terminal having an antenna assembly according to another exemplary embodiment of the present invention.

Referring to FIG. 5, the folder type mobile terminal according to the present exemplary embodiment includes a first body 300, second body 340, and hinge 350.

The second body 340 is moved from a folder-closed state contacting with a front surface of the first body 300 to a folder-open state separated by a predetermined angle from a front surface of the first body 300 by a user manipulation using the hinge 350.

The first body 300 includes a main keypad, microphone, and main PCB. The main PCB includes a wireless communication module for performing wireless communication of the mobile terminal. A connector for connecting an external device is formed at a side of the first body 300 including the main PCB. Particularly, a main antenna 310 is disposed at a side of the first body 300, for example, at a side of an upper part of the first body 300. The main antenna 310 includes an antenna feeding unit connected to the wireless communication module included in the main PCB of the first body 300, and a main coupling antenna connected to the antenna feeding unit and for coupling to a first coupling antenna 320 and second coupling antenna 330 according to a mechanical state. The main antenna 310 is disposed at an upper end portion of the first body 300 and, in some embodiments, is disposed within an upper case to prevent wear or damage due to friction by a hinge operation of the second body 340.

The hinge 350 is disposed between the first body 300 and the second body 340 and enables the second body 340 to perform a hinge operation about the first body 300. When the main PCB is formed in the first body 300, the hinge 350 forms a signal line for supplying a signal from the main PCB to a display unit disposed at the second body 340. The signal line is a Flexible PCB (FPCB) type and connects the first body 300 and the second body 340 through a penetration hole formed within the hinge 350.

The second body 340 includes the display unit, a speaker, a sub-keypad, and a camera module. The second body 340 is disposed on a front surface of the first body 300 about the hinge 350 and performs an opening and closing operation about the hinge 350 by a user manipulation. The first coupling antenna 320 and the second coupling antenna 330 are disposed at a side of an external part of the second body 340.

Figure 6A:
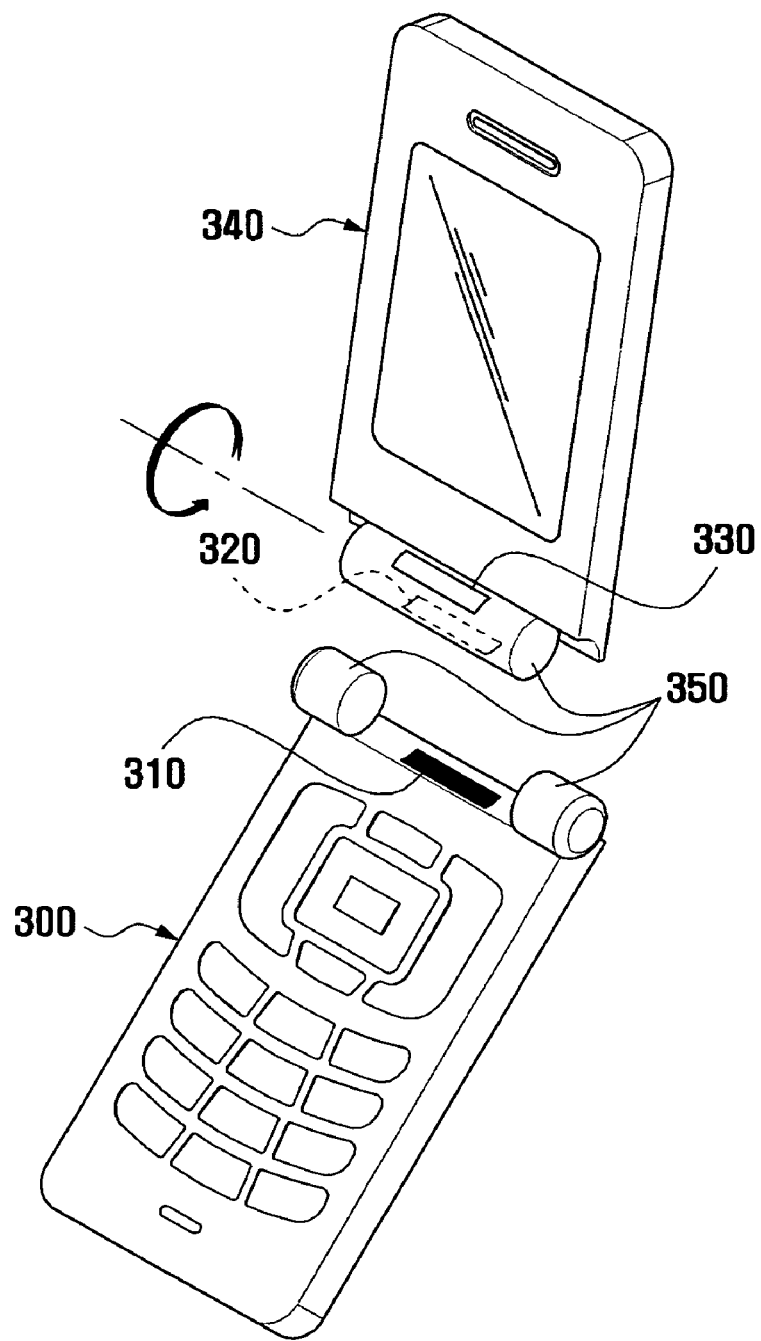
FIGS. 6A and 6B are perspective views illustrating a hinge portion of the folder type mobile terminal of FIG. 5.
Figure 6B:
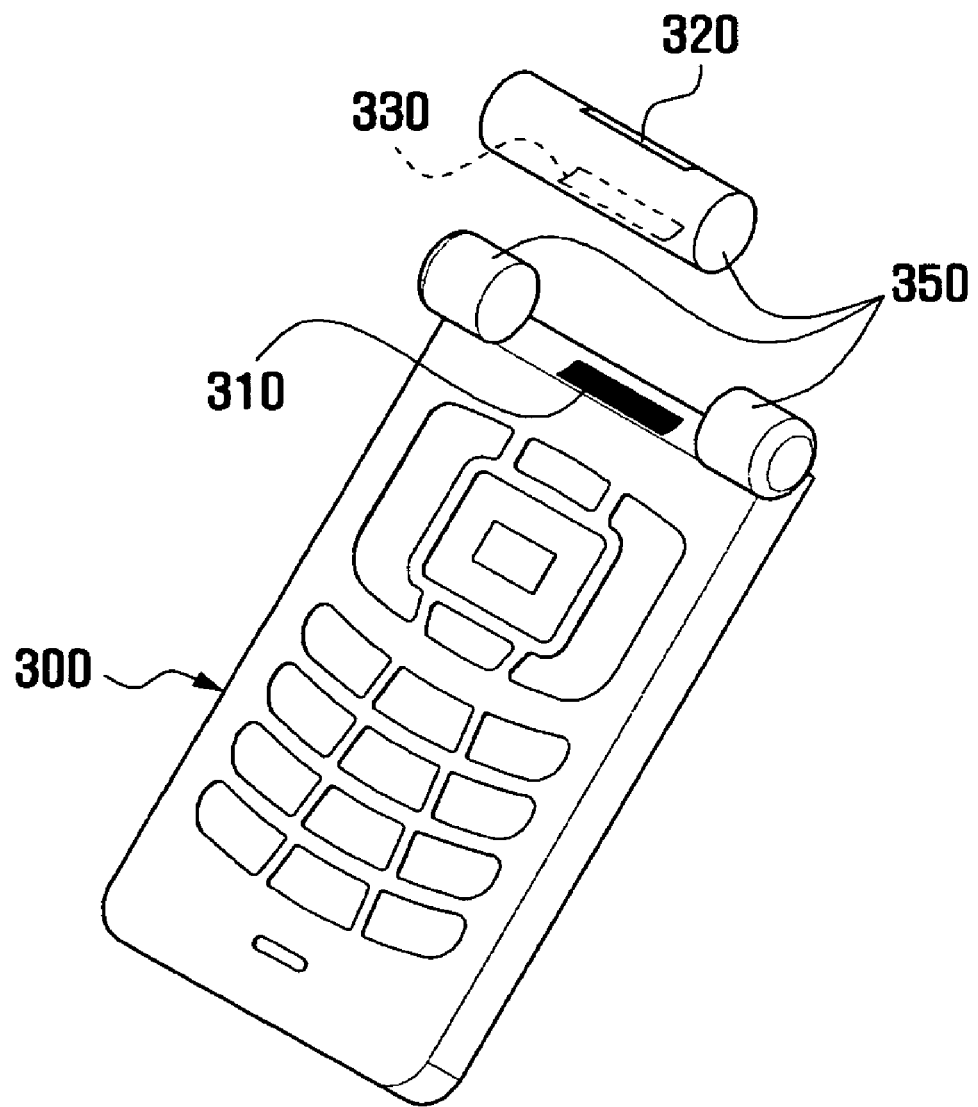

FIGS. 6A and 6B are perspective views illustrating a hinged portion of the folder type mobile terminal of FIG. 5 at which the first coupling antenna 320 and second coupling antenna 330 are disposed.

Referring to FIGS. 6A and 6B, a lower part of the second body 340 corresponding to the hinge 350 has a semi-cylindrical shape, so that a portion of the semi-cylindrical lower end of the second body 340 facing an upper end portion of the first body 300 is changed by a hinge operation. In this case, in the lower end portion of the second body 340, as shown in FIG. 6A, the main antenna 310 formed at the upper end of the first body 300 and the first coupling antenna 320 facing the main antenna 310 in a folder-closed state for coupling are disposed in a lengthwise direction. Further, in the lower end portion of the second body 340, as shown in FIG. 6B, the second coupling antenna 330 is disposed in a lengthwise direction at a predetermined distance from the first coupling antenna 320, so that the second coupling antenna 330 is disposed to couple to the main antenna 310 in a state where the second body 340 is separated from the first body 300. In a case where the first coupling antenna 320 and the second coupling antenna 330 are disposed at the outer side of a case for forming a lower end portion of the second body 340, the first coupling antenna 320 and second coupling antenna 330 may become worn or damaged due to friction with the first body 300 by a hinge operation of the second body 340, therefore in some embodiments, the first coupling antenna 320 and the second coupling antenna 330 are disposed at a predetermined space within the case.

As described above, because an antenna assembly of a folder type mobile terminal according to the present exemplary embodiment of the present invention has coupling antennas to be coupled to a main antenna in a folder-open state and a folder-closed state of the mobile terminal, a radiation pattern of the main antenna can be uniformly maintained even though a mechanical state of the mobile terminal is changed due to a mechanical operation thereof.

Figure 7A:
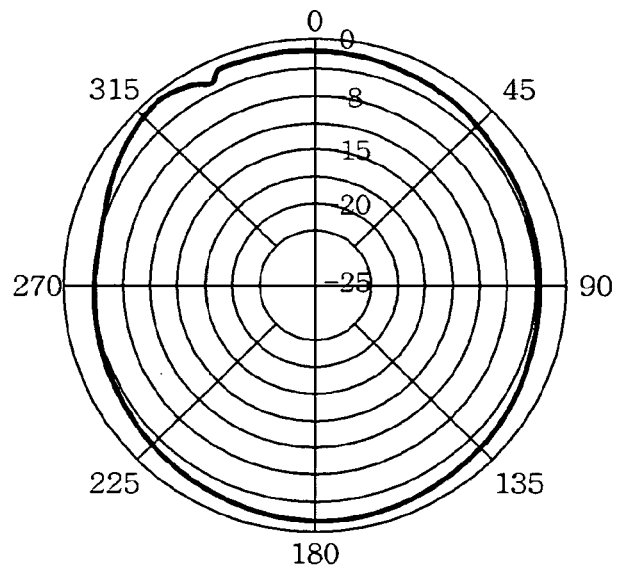
FIGS. 7A and 7B are diagrams illustrating a radiation pattern of mobile terminals according to exemplary embodiments of the present invention.
Figure 7B:
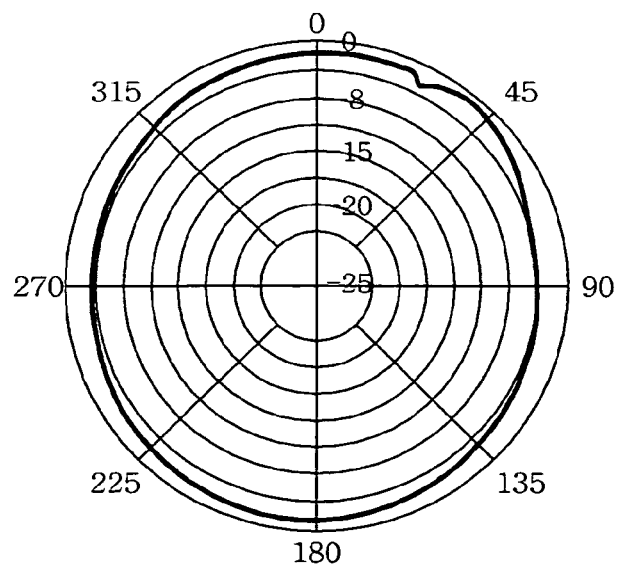

FIG. 7A is a diagram illustrating a radiation pattern in a slide-up state and in a folder-open state of a corresponding type mobile terminal including an antenna assembly according to exemplary embodiments of the present invention, and FIG. 7B is a diagram illustrating a radiation pattern in a slide-down state and in a folder-closed state of a corresponding type mobile terminal including an antenna assembly according to exemplary embodiments of the present invention.

Referring to FIGS. 7A and 7B, the radiation pattern of the mobile terminal including an antenna assembly according to the present exemplary embodiment has an approximately circular shape for all detection coordinates regardless of an operating state of the mobile terminal and this represents that a radiation function is well performed in all directions.

In the foregoing description, a plurality of coupling antennas are provided at the first body and the second body of the mobile terminal, however the present invention is not limited thereto. For example, in a folder type mobile terminal, a user opens a folder to perform communication. Accordingly, the folder type mobile terminal may have only a first coupling antenna for coupling to a main antenna when the folder is opened, without having a coupling antenna for coupling to the main antenna when the folder is closed.

Similarly, in a slide type mobile terminal, the user opens a slider to perform communication. Accordingly, the slide type mobile terminal may have only a coupling antenna for coupling to a main antenna when the slider is opened. When the mobile terminal has only one coupling antenna, the coupling antenna is disposed at a location of the first coupling antenna in the slide type mobile terminal and in the folder type mobile terminal.

As described above, in a mobile terminal having an antenna assembly according to the present invention, an effective antenna bandwidth and gain value can be obtained regardless of a mechanical state change according to a mechanical operation of the mobile terminal with a minimum number of elements.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An antenna assembly of a mobile terminal having a first body and a second body, the antenna assembly comprising:
a main antenna disposed at the first body;
a first coupling antenna disposed at the second body; and
a second coupling antenna disposed at the second body, wherein the first coupling antenna and second coupling antenna are configured to alternatively couple to the main antenna according to a change of a mechanical state of the mobile terminal, wherein at least one of the first coupling antenna and the second coupling antenna is not in contact with the main antenna.

2. The antenna assembly of claim 1, wherein the mechanical state comprises:
a first state in which the second body is in a slide-up state relative to the first body through performing a sliding operation; and
a second state in which the second body is in a slide-down state relative to the first body through performing a sliding operation.

3. The antenna assembly of claim 2, wherein the first coupling antenna is coupled to the main antenna in the first state, and
the second coupling antenna is coupled to the main antenna in the second state.

4. The antenna assembly of claim 3, wherein the main antenna is disposed at an upper part of one of the left side and the right side of the first body,
the first coupling antenna is disposed at a lower part of one of the left side and the right side of the second body corresponding to the side of the first body at which the main antenna is disposed, and
the second coupling antenna is disposed at an upper part of the side of the second body at which the first coupling antenna is disposed.

5. The antenna assembly of claim 1, wherein the mechanical state comprises:
a first state in which the second body is in a rotated state at a predetermined angle to the first body through performing a rotational sliding operation; and
a second state in which the first body and the second body are stacked facing each other.

6. The antenna assembly of claim 5, wherein the first coupling antenna is coupled to the main antenna in the first state, and
the second coupling antenna is coupled to the main antenna in the second state.

7. The antenna assembly of claim 6, wherein the main antenna is disposed at an upper part of one of the left side and the right side of the first body,
the first coupling antenna is disposed at an upper part of one of the left side and the right side of the second body corresponding to the side of the first body at which the main antenna is disposed, and
the second coupling antenna is disposed at an upper part of the side of the second body opposite to the side of the second body at which the first coupling antenna is disposed.

8. The antenna assembly of claim 1, wherein the mechanical state comprises:
a first state in which the second body of the mobile terminal is in an open state through performing a hinge operation; and
a second state in which the second body of the mobile terminal is in a closed state through performing a hinge operation.

9. The antenna assembly of claim 8, wherein the first coupling antenna is coupled to the main antenna in the first state, and
the second coupling antenna is coupled to the main antenna in the second state.

10. The antenna assembly of claim 9, wherein the main antenna is disposed at an upper part of the first body facing the second body,
the first coupling antenna is disposed at a lower part of the second body facing the first body, and
the second coupling antenna is disposed at a lower part of the second body facing the first body and is separated by a predetermined distance from the first coupling antenna.

11. The antenna assembly of claim 1, wherein at least one of the main antenna, the first coupling antenna, and the second coupling antenna is disposed at a predetermined space within a case of the mobile terminal.

12. A mobile terminal comprising:
a first body;
a second body moveably coupled to the first body;
a main antenna disposed at the first body;
a first coupling antenna disposed at the second body, the first coupling antenna configured to couple to the main antenna when the second body is disposed in a first position relative to the first body; and
a second coupling antenna disposed at the second body, the second coupling antenna configured to couple to the main antenna when the second body is disposed in a second position relative to the first body, wherein at least one of the first coupling antenna and the second coupling antenna is not in contact with the main antenna.

13. The mobile terminal of claim 12, wherein the first position comprises a first state in which the second body is in a slide-up state relative to the first body through performing a sliding operation, and wherein the second position comprises a second state in which the second body is in a slide-down state relative to the first body through performing a sliding operation.

14. The mobile terminal of claim 12, wherein the main antenna is disposed at an upper part of one of the left side and the right side of the first body,
the first coupling antenna is disposed at a lower part of one of the left side and the right side of the second body corresponding to the side of the first body at which the main antenna is disposed, and
the second coupling antenna is disposed at an upper part of the side of the second body at which the first coupling antenna is disposed.

15. The mobile terminal of claim 12, wherein the first position comprises a first state in which the second body is in a rotated state at a predetermined angle to the first body through performing a rotational sliding operation, and wherein the second position comprises a second state in which the first body and the second body are stacked facing each other.

16. The mobile terminal of claim 12, wherein the main antenna is disposed at an upper part of one of the left side and the right side of the first body,
the first coupling antenna is disposed at an upper part of one of the left side and the right side of the second body corresponding to the side of the first body at which the main antenna is disposed, and the second coupling antenna is disposed at an upper part of the side of the second body opposite to the side of the second body at which the first coupling antenna is disposed.

17. The mobile terminal of claim 12, wherein the first position comprises a first state in which the second body of the mobile terminal is in an open state through performing a hinge operation, and wherein the second position comprises a second state in which the second body of the mobile terminal is in a closed state through performing a hinge operation.

18. The mobile terminal of claim 12, wherein the main antenna is disposed at an upper part of the first body facing the second body, the first coupling antenna is disposed at a lower part of the second body facing the first body, and
the second coupling antenna is disposed at a lower part of the second body facing the first body and is separated by a predetermined distance from the first coupling antenna.

19. The mobile terminal of claim 12, wherein at least one of the main antenna, the first coupling antenna, and the second coupling antenna is disposed at a predetermined space.

20. The mobile terminal of claim 12, wherein at least one of the main antenna, the first coupling antenna, and the second coupling antenna is disposed within a case of the mobile terminal.

* * * * *

UNITED STATES PATENT AND TRADEMARK OFFICE
CERTIFICATE OF CORRECTION

PATENT NO. : 8,320,980 B2
APPLICATION NO. : 12/455535
DATED : November 27, 2012
INVENTOR(S) : Lee et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 453 days.

Signed and Sealed this
Twenty-sixth Day of August, 2014

Michelle K. Lee
*Deputy Director of the United States Patent and Trademark Office*